US010964321B2

(12) United States Patent
Rohatgi et al.

(10) Patent No.: US 10,964,321 B2
(45) Date of Patent: Mar. 30, 2021

(54) VOICE-ENABLED HUMAN TASKS IN PROCESS MODELING

(71) Applicant: SAP SE, Walldorf (DE)

(72) Inventors: Vikas Rohatgi, Kanpur (IN); Abhinav Kumar, Bangalore (IN)

(73) Assignee: SAP SE, Walldorf (DE)

( * ) Notice: Subject to any disclaimer, the term of this patent is extended or adjusted under 35 U.S.C. 154(b) by 201 days.

(21) Appl. No.: 16/212,069

(22) Filed: Dec. 6, 2018

(65) Prior Publication Data

US 2020/0184961 A1    Jun. 11, 2020

(51) Int. Cl.
*G10L 15/22* (2006.01)
*G10L 15/18* (2013.01)
*G10L 13/00* (2006.01)

(52) U.S. Cl.
CPC .............. *G10L 15/22* (2013.01); *G10L 13/00* (2013.01); *G10L 15/1815* (2013.01); *G10L 2015/223* (2013.01)

(58) Field of Classification Search
CPC ...... G10L 15/22; G10L 15/1815; G10L 15/00; G10L 13/00; G10L 2015/223; G10L 15/26; G06Q 10/0633; G06Q 10/103; G06Q 10/06311; G06Q 10/06314; G06Q 10/06315; G06Q 10/06316; G06F 3/167
See application file for complete search history.

(56) References Cited

U.S. PATENT DOCUMENTS

2008/0109292 A1* 5/2008 Moore .................. G06Q 10/06
                                                              715/728
2016/0328667 A1* 11/2016 Macciola ............... G06Q 10/10

OTHER PUBLICATIONS

U.S. Appl. No. 16/052,113, Kumar et al., filed Aug. 1, 2018.

* cited by examiner

*Primary Examiner* — Yogeshkumar Patel
(74) *Attorney, Agent, or Firm* — Fish & Richardson P.C.

(57) ABSTRACT

The present disclosure involves systems, software, and computer implemented methods for providing voice-enabled human tasks in process modeling. One example method includes receiving a deployment request for a workflow that includes a human task. The workflow is deployed to a workflow engine in response to the deployment request. An instance of the workflow is created in response to a request from a client application. The instance of the workflow is processed, including execution of the human task. The human task is added to a task inbox of an assignee of the human task. A request is received from the assignee to access the task inbox from a telecommunications system. Voice guidance is provided, to the assignee, that requests assignee input. Voice input from the assignee is processed for completion of the human task. Workflow context for the human task is updated based on the received voice input.

20 Claims, 4 Drawing Sheets

Human Task Form meta-data format

```
{
"Form": {
    "subject": "<human task subject>", —306
    "attributes": [{
        "<attribute_name>": { —310
            "data_type": "DATE | TIME | NUMBER | STRING ...", —314
            "mandatory": true | false —316
        }
    }], —312
    "actions": [{ —324
        "name": "APPROVE | REJECT | ...", —326
        "url": "<action_url>" —328
    }],
    "form_type": "UI | Voice | UI & VOICE" —334
}
}
```
—302

Human Task Form meta-data:

```
{
"Form": {
    "subject": "Employee Leave Request", —308
    "attributes": [{
        "Comment for Leave Decision": { —318
            "data_type": "STRING", —320
            "mandatory": false —322
        }
    }], —330
    "actions": [{ —331
        "name": "APPROVE",
        "url": "/human_tasks/leave_request/approve" —332
    }, {
        "name": "REJECT",
        "url": "/human_tasks/leave_request/reject"
    }],
    "form_type": "UI & Voice" —336
}
}
```
—304

VOICE-ENABLED HUMAN TASKS IN PROCESS MODELING

TECHNICAL FIELD

The present disclosure relates to computer-implemented methods, software, and systems for providing voice-enabled human tasks in process modeling.

BACKGROUND

A workflow is a repeatable pattern of actions performed in an organization. A workflow can be modeled, with a model including a defined sequence of operations, processes and tasks, with connected logic. A workflow management system is a software system for setting up, modeling, performing, and monitoring workflows. Workflows can be modeled and managed to increase productivity, reduce costs, and improve information exchange within an organization.

SUMMARY

The present disclosure involves systems, software, and computer implemented methods for providing voice-enabled human tasks in process modeling. One example method includes receiving a deployment request for a workflow of an end-to-end process that includes a human task, wherein the human task is enabled to receive voice input. The workflow is deployed to a workflow engine in response to the deployment request. An instance of the workflow is created in response to a request from a client application. The instance of the workflow is processed, including execution of the human task. Executing the human task comprises determining an assignee of the human task and adding the human task to a task inbox of the assignee. A request from the assignee to access the task inbox is received from a telecommunications system. Each task in the task inbox that is voice-enabled is executed. Voice guidance is provided to the assignee, that requests assignee input for completion of the human task. Voice input from the assignee is processed for completion of the human task. Workflow context for the human task is updated based on the received voice input.

While generally described as computer-implemented software embodied on tangible media that processes and transforms the respective data, some or all of the aspects may be computer-implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DETAILED DESCRIPTION

Human tasks are an integral part of many processes used within an organization. A human or user task can be a task included in a process model that requires or may require human intervention. Example human tasks include "sales contract terms approval", "leave approval", "purchase order approval", "business practice review", and "entering quote for bid", to name a few examples.

A user in an organization can receive human tasks in an inbox that is presented in a graphical user interface (GUI) of an electronic mail application or a workflow application, for example. However, a user interacting with human tasks using a GUI, on a computer or smart phone device, can have various disadvantages. For example, for many graphical applications that interact with data stored on a server, a task owner working on a human task needs to have network connectivity to act upon tasks in an inbox. If, for example, a manager is travelling without network connectivity (e.g., network service may not available or a roaming plan may not support mobile data), the manager/task owner may have no option but to postpone working on tasks until network connectivity is obtained.

As another example, using a graphical user interface on a computing device may be inconvenient or not possible for certain task owners during their day to day work. For example, some task owners may be "on the go", such as working on a factory floor or in a warehouse, frequently moving from place to place, supervising other employees, etc. Such task owners may not have time to open a graphical interface on a computing device and interact with the graphical interface, or may not desire to physically carry around a device that has a large enough screen to make interacting with a complex user interface practical. Interacting with/entering information for certain tasks may be particularly inconvenient for those task owners who can't or prefer to not carry a computing device capable of displaying a complex user interface. For instance, some tasks may involve multiple inputs, such as a decision portion (e.g., approve, reject), and a commentary portion (e.g., entering a description for a decision choice). Some task management applications may require that a user enter information in multiple places, such as multiple input areas. Multiple inputs, entered in multiple areas of a graphical user interface, can be cumbersome and inconvenient for mobile task owners who may simply want to process inbox tasks as quickly as possible to enable returning to other work.

To make interacting with human tasks more convenient and efficient, a human voice task can be introduced in a workflow/process management system. With a human voice task, a task owner can work on an assigned task by talking, in natural language, rather than working with a task in a graphical user interface. The task owner can use, for example, a telephone-based system to access tasks. Access to the telephone-based system can be made using any kind of telephone device, including devices that don't support graphical user interfaces (e.g., a non "smart" phone, or a device used by visually-impaired users).

The task owner can call the telephone-based system or can be called (such as when a task is assigned). The task owner can authenticate with the system using a personal identification number, for example. After authentication, a task executor can convey assigned tasks to the authenticated task owner over an audio phone call.

A reverse chat bot, powered by NLP (Natural Language Processing) can assist the task owner to provide information for and complete assigned tasks. The reverse chat bot can prompt the task owner and guide the task owner to provide information (e.g., answer questions) necessary for task completion. Information obtained by the reverse chat bot can be provided to a workflow engine, for updating of completed/worked-on tasks.

A human voice task can provide multiple advantages. For instance, a task owner can work on workflow tasks even when without internet connectivity. A human voice task enables a task owner to work on a workflow task using just a basic mobile or landline phone, rather than a more complex device or interaction. A task owner can work on a workflow task without having to log into or interact with a graphical user interface on a computer or smart-phone. Voice and natural language processing engines can enable a task owner to interact with workflow tasks by using only voice inputs. Such systems can provide accessibility, e.g., for visually impaired users. Additionally, a system that accepts voice input can accept a voice input in a user's native/local language. The system can translate any human voice input, from any language, into text values in a standardized language (e.g., English), for example. The system can produce voice outputs in the user's native language, for example, when describing available workflow tasks to the user. Voice input can be provided to a workflow task to enhance the workflow task with the voice input and enable a workflow process to proceed to subsequent tasks in the workflow.

Figure 1:
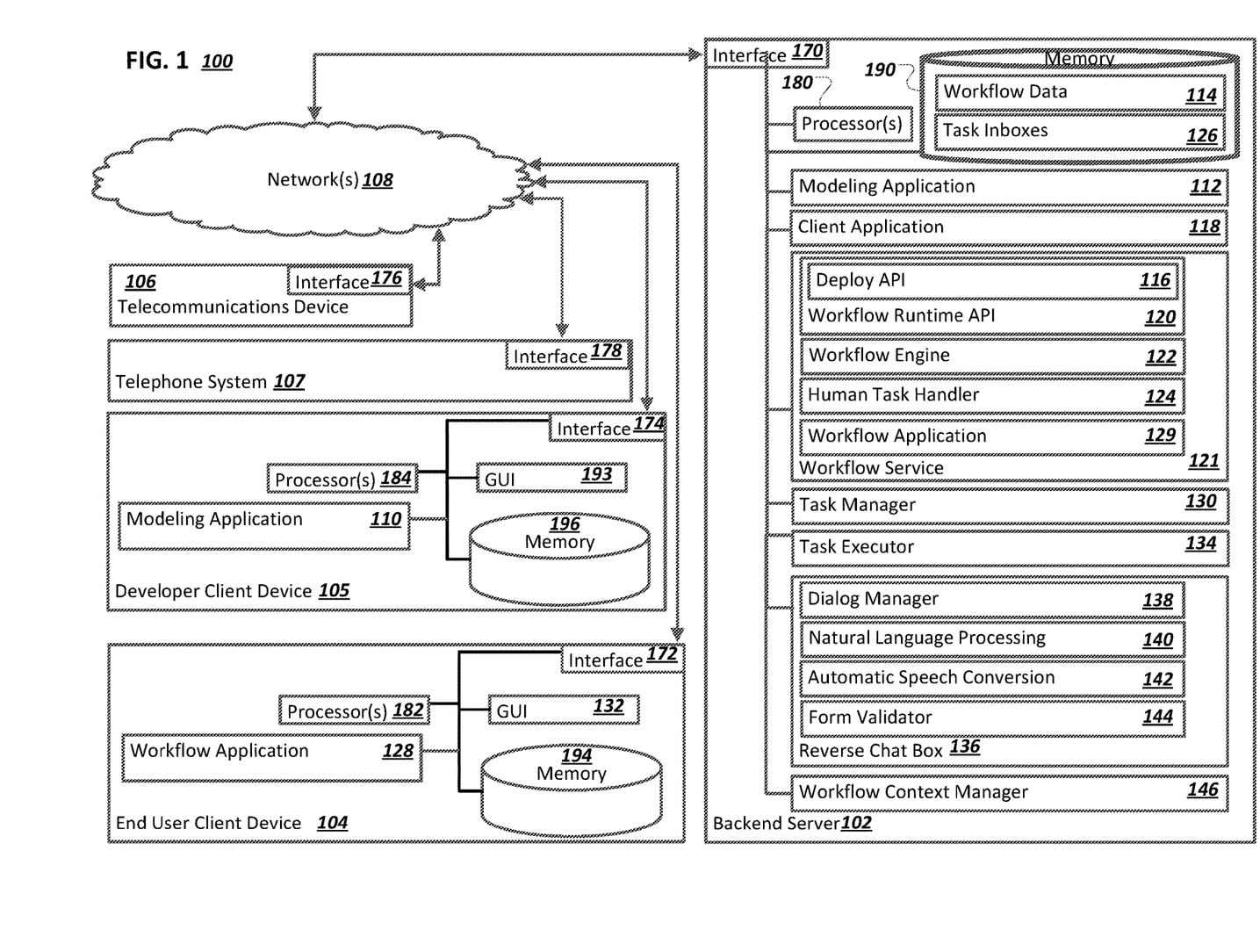
FIG. 1 is a block diagram illustrating components of an example system for providing voice-enabled human tasks in process modeling.

FIG. 1 is a block diagram illustrating components of an example system 100 for providing voice-enabled human tasks in process modeling. Specifically, the illustrated system 100 includes or is communicably coupled with a back-end server 102, an end user client device 104, a developer client device 105, a telecommunications device 106, a telephone system 107, and one or more network(s) 108. Although shown separately, in some implementations, functionality of two or more systems or servers may be provided by a single system or server. In some implementations, the functionality of one illustrated system or server may be provided by multiple systems or servers. For example, although illustrated as a single backend server 102, the system 100 can include multiple application servers, a database server, a workflow server, a centralized services server, or some other combination of systems or servers.

A workflow developer can use a modeling application 110 to model a workflow. The modeling application 110 may be a client-side version of a modeling application 112 provided by the backend server 102. The workflow developer can include a human task in the workflow and specify that the human task is able to accept voice input. The workflow can be stored as workflow data 114 at the backend server 102. The workflow data 114 can include task metadata for the human task. The workflow developer can use a deploy API 116 to deploy the modeled workflow.

The backend server 102 can execute a client application 118, on behalf of one or more clients, and can receive input from one or more client devices, such as an end-user client device 104 of an end user in an organization to which the workflow has been deployed. User input from an end user can be provided to the client application 118. The client application 118 can determine that the user input is to trigger the workflow deployed by the workflow developer. The client application 118 can be configured to invoke a workflow runtime API 120 provided by a workflow service 121 to create an instance of the workflow. A workflow engine 122 can process the instance of the workflow. The workflow engine 122 can determine that the workflow includes a human task and can invoke a human task handler 124 to process the human task.

Processing the human task can include assigning the human task to a particular end user. For example, the client application 118 may be a human resources application in which employees can request vacations, or leaves of absence. A particular employee may use the human resources application to submit a leave request. The leave request user input may trigger a leave request workflow. The leave request workflow can include a human leave-request approval task in which a manager approves or rejects a given leave request. Processing the leave request workflow can include assigning a given leave request to a manager of the employee who made the request.

Assigning a human task to a particular user can include the adding of the human task, by the human task handler 124, to a task inbox 126 for the particular user. For example, a leave request can be added to a task inbox 126 for a manager in response to an employee of the manager submitting a leave request. The manager can use a workflow application 128 on an end-user client device 104 to view contents of the task inbox 126 of the manager, to view and act on assigned tasks. The workflow application 128 can be a client-side version of a server-based workflow application 129. A task manager 130 can use the workflow runtime API 120 to retrieve tasks assigned to the manager, for presentation in the workflow application 128.

The workflow application 128 can be presented on a GUI 132, for example. As described above, interacting with tasks using a GUI can be inconvenient and not preferable for some users. As an alternative or in addition to the GUI-based presentation, the manager can also use the telecommunications device 106 to access the workflow application 129 and personal task inbox 126, such as where such interactions are a more convenient way to manage assigned tasks. The manager can use the telecommunications device 106 to place a call to the telephone system 107. The telephone system 107 and/or the workflow engine 122 can include authorization component(s) to authorize a given end user. For example, the end user can provide a personal identification number (PIN) uniquely identifying the end user via the telecommunications device 106 over the telephone system 107, which is verified by the workflow engine 122.

A task executor 134 can access each task in the task inbox 126 of the authorized user and enable the user to interact with each assigned task that has been voice-enabled. The end user can be assisted with task access and completion by a reverse chat bot 136. The reverse chat bot 136 is described in more detail below but is briefly described here.

A dialog manager 138 can provide audio prompts for the user and accept voice input from the user. Audio prompt text can be generated by a NLP component 140, based on human task metadata. An automatic speech conversion component 142 can include speech-to-text and text-to-speech modules, for converting audio prompt text into audio (for playback to the user) and for converting voice input received by the user into text, for processing by the NLP component 140. A form validator 144 can verify whether voice input received from the user, after being converted to text and interpreted by the NLP engine 140, satisfies required input(s) for the human task. If required inputs have not been submitted, the NLP engine 140 can convert error information received from the form validator 144 into follow-on directions, to be converted to audio follow-on prompts by the automatic speech conversion component 142, for playback to the user.

Workflow context, which can represent answers and inputs from the end user for a completed task, can be provided to a workflow context manager 146. The workflow context manager 146 can call the workflow runtime API 120 to update the workflow data 114, which can include marking the human task as completed, for example.

Interacting with the task inbox 126 and the workflow application 129 using the telecommunications device 106 provides advantages for the end user, as described above, including being able to work on tasks when network or data plan conditions allow for regular cellular telecommunication but not data transfer required by a smart phone or other computing device. Additionally, the providing of voice input can be easier for users who may be mobile or using hands for other purposes, as compared to interacting with the GUI 132, for example. Although the telecommunications device 106 can provide such advantages, the end-user client device 104 can provide similar advantages, if a version of the workflow application 128 is configured to run as a background application that can provide voice prompts and accept voice input without direct user interaction, provide data to the workflow application 129 in response to voice input, etc., for example.

As used in the present disclosure, the term "computer" is intended to encompass any suitable processing device. For example, although FIG. 1 illustrates a single backend server 102, a single end-user client device 104, a single developer client device 105, and a single telecommunications device 106, the system 100 can be implemented using a single, stand-alone computing device, two or more backend servers 102, two or more end-user client devices 104, two or more developer client devices 105, two or more telecommunications devices 106, etc. Indeed, the backend server 102, the developer client device 105, and the client device 104 may be any computer or processing device such as, for example, a blade server, general-purpose personal computer (PC), Mac®, workstation, UNIX-based workstation, or any other suitable device. In other words, the present disclosure contemplates computers other than general purpose computers, as well as computers without conventional operating systems. Further, the backend server 102, the developer client device 105, and the end-user client device 104 may be adapted to execute any operating system, including Linux, UNIX, Windows, Mac OS®, Java™, Android™, iOS or any other suitable operating system. According to one implementation, the backend server 102 may also include or be communicably coupled with an e-mail server, a Web server, a caching server, a streaming data server, a workflow server, an application server, and/or other suitable server.

The telecommunications device 106 can be a landline telephone, a cellular device, a smart phone, a walkie-talkie, or any other telecommunications device that is capable of communicating with the telephone system 107, over one or more network(s) 108. The network(s) 108 can include the Internet, a wired or wireless telecommunications network, or one or more other public or private, wired or wireless networks.

Interfaces 170, 172, 174, 176, and 178 are used by the backend server 102, the end-user client device 104, the developer client device 105, the telecommunications device 106, and the telephone system 107, respectively, for communicating with other systems in a distributed environment—including within the system 100—connected to the network(s) 108. Generally, the interfaces 170, 172, 174, 176, and 178 each comprise logic encoded in software and/or hardware in a suitable combination and operable to communicate with the network(s) 108. More specifically, the interfaces 170, 172, 174, 176, and 178 may each comprise software supporting one or more communication protocols associated with communications such that the network(s) 108 or interface's hardware is operable to communicate physical signals within and outside of the illustrated system 100. The interface 176 and 178 enable the telecommunications device 106 to communicate with the telephone system 107, respectively.

The backend server 102, the end-user client device 104, and the developer client device 105, each respectively include one or more processors 180, 182, or 184. Each processor in the processors 180, 182, and 184 may be a central processing unit (CPU), a blade, an application specific integrated circuit (ASIC), a field-programmable gate array (FPGA), or another suitable component. Generally, each processor in the processors 180, 182, and 184 executes instructions and manipulates data to perform the operations of a respective computing device.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java™, JavaScript®, Visual Basic, assembler, Perl®, any suitable version of 4GL, as well as others. While portions of the software illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

The backend server 102 includes the memory 190. In some implementations, the backend server 102 includes multiple memories. The memory 190 may include any type of memory or database module and may take the form of volatile and/or non-volatile memory including, without limitation, magnetic media, optical media, random access memory (RAM), read-only memory (ROM), removable media, or any other suitable local or remote memory component. The memory 190 may store various objects or data, including caches, classes, frameworks, applications, backup data, business objects, jobs, web pages, web page templates, database tables, database queries, repositories storing business and/or dynamic information, and any other appropriate information including any parameters, variables, algorithms, instructions, rules, constraints, or references thereto associated with the purposes of the backend server 102.

The end-user client device 104 and the developer client device 105 may each be any computing device operable to connect to or communicate in the network(s) 108 using a wireline or wireless connection. In general, each of the end-user client device 104 and the developer client device 105 comprises an electronic computer device operable to receive, transmit, process, and store any appropriate data associated with the system 100 of FIG. 1. Each of the end-user client device 104 and the developer client device 105 can include one or more client applications, including the workflow application 128 or the modeling application 110, respectively. A client application is any type of application that allows a client device to request and view content on the client device. In some implementations, a client application can use parameters, metadata, and other information received at launch to access a particular set of data from the backend server 102. In some instances, a client application may be an agent or client-side version of the one or more enterprise applications running on an enterprise server (not shown).

Each of the end-user client device 104 and the developer client device 105 is generally intended to encompass any client computing device such as a laptop/notebook computer, wireless data port, smart phone, personal data assistant (PDA), tablet computing device, one or more processors within these devices, or any other suitable processing device. For example, the end-user client device 104 and/or the developer client device 105 may comprise a computer that includes an input device, such as a keypad, touch screen, or other device that can accept user information, and an output device that conveys information associated with the operation of the backend server 102, or the client device itself, including digital data, visual information, or the GUI 132 or a GUI 193, respectively.

The GUI 132 and the GUI 193 each interface with at least a portion of the system 100 for any suitable purpose, including generating a visual representation of the workflow application 128 or the modeling application 110, respectively. In particular, the GUI 132 and the GUI 193 may each be used to view and navigate various Web pages. Generally, the GUI 132 and the GUI 193 each provide the user with an efficient and user-friendly presentation of business data provided by or communicated within the system. The GUI 132 and the GUI 193 may each comprise a plurality of customizable frames or views having interactive fields, pull-down lists, and buttons operated by the user. The GUI 132 and the GUI 193 each contemplate any suitable graphical user interface, such as a combination of a generic web browser, intelligent engine, and command line interface (CLI) that processes information and efficiently presents the results to the user visually.

Memory 194 and memory 196 respectively included in the end-user client device 104 or the developer client device 105 may each include any memory or database module and may take the form of volatile or non-volatile memory including, without limitation, magnetic media, optical media, random access memory (RAM), read-only memory (ROM), removable media, or any other suitable local or remote memory component. The memory 194 and the memory 196 may each store various objects or data, including user selections, caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the respective client device.

There may be any number of end-user client devices 104, developer client devices 105, and telecommunications devices 106 associated with, or external to, the system 100. Additionally, there may also be one or more additional client devices external to the illustrated portion of system 100 that are capable of interacting with the system 100 via the network(s) 108. Further, the term "client," "client device," and "user" may be used interchangeably as appropriate without departing from the scope of this disclosure. Moreover, while client device may be described in terms of being used by a single user, this disclosure contemplates that many users may use one computer, or that one user may use multiple computers.

Figure 2:
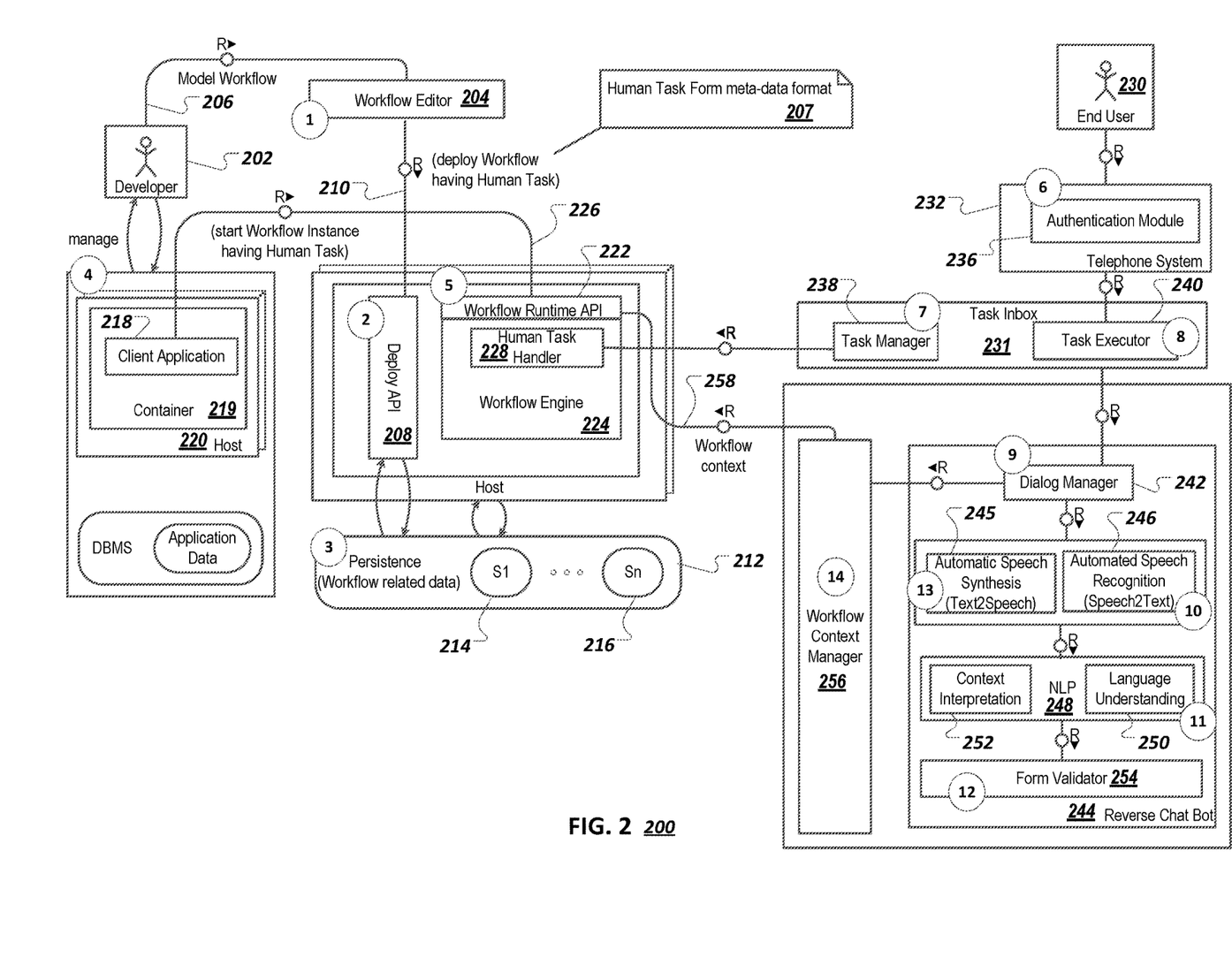
FIG. 2 is a block diagram illustrating an example system for providing voice-enabled human tasks in process modeling.

FIG. 2 is a block diagram illustrating an example system 200 for providing voice-enabled human tasks in process modeling. In a first stage (e.g., illustrated as a circled "1"), a workflow developer 202 uses a workflow editor 204 to model a workflow (206). The workflow can be for "Leave Approval," "Purchase Order Approval," "Sales Contract Terms Approval," "Business Practice Review," or "Entering Quote for Bid" processes, to name a few examples. Any other suitable example process may use variations on the described solution. The modeled workflow can have a human task that is represented by metadata that complies with a human task meta-data format 207. The human task meta-data format 207 is described in more detail below with respect to FIG. 3. The metadata for the workflow can specify that the human task in the workflow has a form that enables voice input.

In a second stage, the workflow developer uses a deploy API (Application Programming Interface) 208 to deploy the modeled workflow (210). Deploying the modeled workflow can include, as represented in a third stage, storing the modeled workflow, including workflow metadata (and data that describes the human task) in persistence layer (e.g., a database management system (DBMS)) 212. The persistence layer 212 can support multi-tenancy, with tenant-specific schemas. For example, a 51 schema 214 can be used to store modeled workflows and other workflow-related data for a first tenant and a Sn schema 216 can be used to store workflow-related data for a second tenant.

In a fourth stage, a client application 218 running in a container 219 on a host 210 can trigger the workflow that was modeled by the workflow developer 202. Execution of the workflow can include reaching a point in the workflow that corresponds to the human task. For example, an employee of a company may use a leave-request portal to request a work leave, and employee interaction with the portal, such as the submitting of a leave-request, can trigger a leave-approval workflow.

Triggering the workflow can result, as represented in a fifth stage, in the calling, by the client application 218, of a workflow runtime API 222 provided by a workflow engine 224. Invoking the workflow runtime API 222 can result in a workflow instance of the workflow modeled by the workflow developer 202 being created (226). The workflow instance can have a human task portion. The workflow engine 224 can include a human task handler 228 that is configured to handle human tasks included in workflows. Handling a workflow that includes a human task can include assigning one or more human tasks to an end user 230. Task assignment can include adding an assigned task to a task inbox 231 associated with the end user 230. The task inbox 231 can be accessed by the end user 230 using a graphical user interface application or using a telephone system 232.

In a sixth stage, the end user 230 connects to the telephone system 232 to access the task inbox 231 associated with the end user 230. An authentication module 236 can authenticate the end user 230. For example, the end user 230 can enter a PIN. The authentication module 236 can be included in or otherwise associated with the telephone system 232 or can be included in or associated with the workflow engine 224. For example, the authentication module 236 can determine whether a provided PIN matches a PIN stored for the user in the persistence layer 212.

If the end user 230 is authenticated, a task manager 238 can, in a seventh stage, call the workflow runtime API 222 to retrieve human tasks that have been assigned to the end user 230. For example, if the end user 230 is a department manager, the task manager 238 may retrieve all leave requests that have been assigned to the manager. Although retrieving tasks for a particular end user 230 upon demand (e.g. upon login) is described, in some implementations, the task manager 238 can retrieve tasks for insertion into the task inbox 231 of the end user periodically (e.g., every minute), or can be called to insert a task into the task inbox 231 by the human task handler 228 when a human task has been assigned to the end user 230.

In an eighth stage, a task executor 240 can retrieve and execute each task in the task inbox 231. For each task, and as represented in a ninth stage, the task executor 240 can invoke a dialog manager 242 included in a reverse chat bot component 244 to manage interaction with the end user 230 for completion of the task. The dialog manager 242 can prompt the end user 230 for particular information. For example, for a leave request, the dialog manager 242 can provide a prompt, for playback over the telephone system 232 to the logged-in end user 230, that asks the end user 230 whether a given leave request is to be approved or rejected. The prompt can be generated by an automatic speech synthesis (e.g., text to speech) engine 245, based on task metadata. The dialog manager 242 can receive an audio reply from the end user 230 and provide the audio reply to a speech recognition (e.g., speech to text) engine 246.

In a tenth stage, the speech recognition engine 246 converts the audio reply into text. In an eleventh stage, the speech recognition engine 246 provides the generated text to a NLP (Natural Language Processing) engine 248. The NLP engine 248 can use a language understanding component 250 to identify n-grams in the generated text and interpret the text. Interpreting the text can include the use of a context interpretation component 252, for determining how and whether generated text matches the context of a particular task, and for determining meaning of generated text keywords. Matching generated text to a task context can include matching generated text to form metadata associated with the task. Form metadata can be included or associated with each task in the task inbox 231 and forwarded to or otherwise made available to components included in the reverse chat bot 244, including the context interpretation component 252.

In a twelfth stage, a form validator 254 validates input provided by the end user 230, such as determining, based on form metadata, whether answers for mandatory questions or fields have been provided. For example, a human task can be modeled such that if a manager rejects a leave request, a rejection description must be provided to be a valid input.

If required inputs have not been provided by the task owner, follow-on directions can be determined from error information generated by the form validator 254. For example, the form validator 254 may provide error information of "description missing" to the NLP engine 248. The NLP engine 248 can interpret the "description missing" error information and generate follow-on directions, for example, of "Can you please provide the description also?"

In a thirteenth stage, the follow-on directions can be provided to the automatic speech synthesis engine 245. In some implementations, follow-on audio prompts can be generated by the automatic speech synthesis engine 246 from the follow-on directions, for playback to the end user 230.

Once the human task has been completed, and the dialog manager 242 has finished interacting with the end user, the dialog manager 242 can provide workflow context, which can represent answers and inputs from the end user 230, to a workflow context manager 256. The workflow context manager 256 can, in a fourteenth stage, invoke the workflow runtime API 222, to update workflow context in the persistence layer 212 for the end user 230, and mark the human task as completed, for example. If form metadata for the human task indicated one or more actions to be performed if certain types of task input have been received, then any action for which corresponding task input was received can be invoked, using, for example, an action URL associated with a respective action. If the workflow includes other tasks, including other human tasks or other types of tasks, then workflow processing can proceed, with execution of the other tasks in the workflow.

Figure 3:
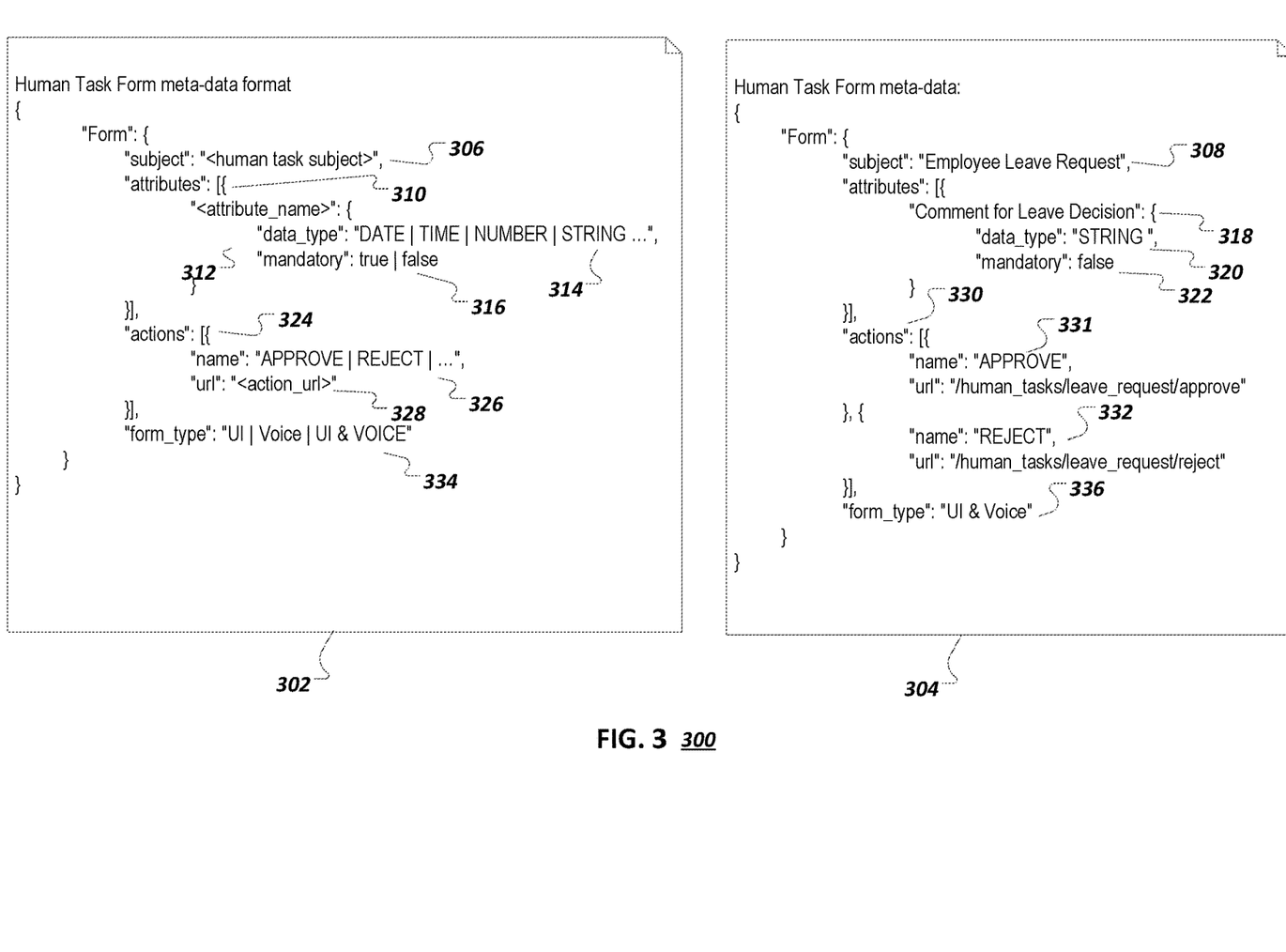
FIG. 3 illustrates an example of a human voice task meta-data format description and a corresponding human voice task meta-data instance.

FIG. 3 illustrates an example of a human voice task meta-data format description 302 and a corresponding human voice task meta-data instance 304. The meta-data format description 302 describes a format for meta-data instances such as the meta-data instance 304. The meta-data format description 302 specifies that meta-data instances can have a subject 306 that is a title for a human task. For example, the meta-data instance 304 includes a subject 308 of "Employee Leave Request".

The meta-data format description 302 specifies that a meta-data instance can include an attribute list 310, with each attribute having an attribute name 312, a data type 314, and a mandatory indicator 316. The meta-data instance 304 includes a comment-for-leave-decision attribute 318, with a datatype 320 of string, and a mandatory indicator 322 of false. The mandatory indicator 322 can be false because a comment may not always be required when acting on an employee leave request. For instance, a manager can simply "approve" without specifying a reason. A manager may specify a reason when rejecting a leave request, for example. Although the meta-data instance 304 represents the handling of a leave request for both approval and rejection outcomes, in some examples, separate meta-data instances can be provided for an employee leave approval and an employee leave rejection, and for those examples, a comment attribute for a rejection meta-data instance can be specified as mandatory.

The meta-data format description 302 specifies that a meta-data instance can have an action list 324, with each action having an action name 326 and an action URL (Uniform Resource Locator) 328. The meta-data instance 304 includes an action list 330 that includes an approve action 331 and a reject action 332, each with corresponding action URLs. A respective action URL can be invoked to perform a particular action if a task owner provides input for a task (e.g., an approval for a leave request) that indicates that the action is to be performed.

The meta-data format description 302 specifies that a meta-data instance can have a form type 334. A form type can be, for example, UI, voice, or UI and Voice. The respective form type values enables a human task to be defined as being actionable using just a GUI, just voice, or using either a GUI or voice, respectively. A form type value can apply to all users acting on the certain type of task. The meta-data instance 304 includes a form type 336 of UI and voice, indicating that the task can be completed using either a UI or using voice input.

Figure 4:
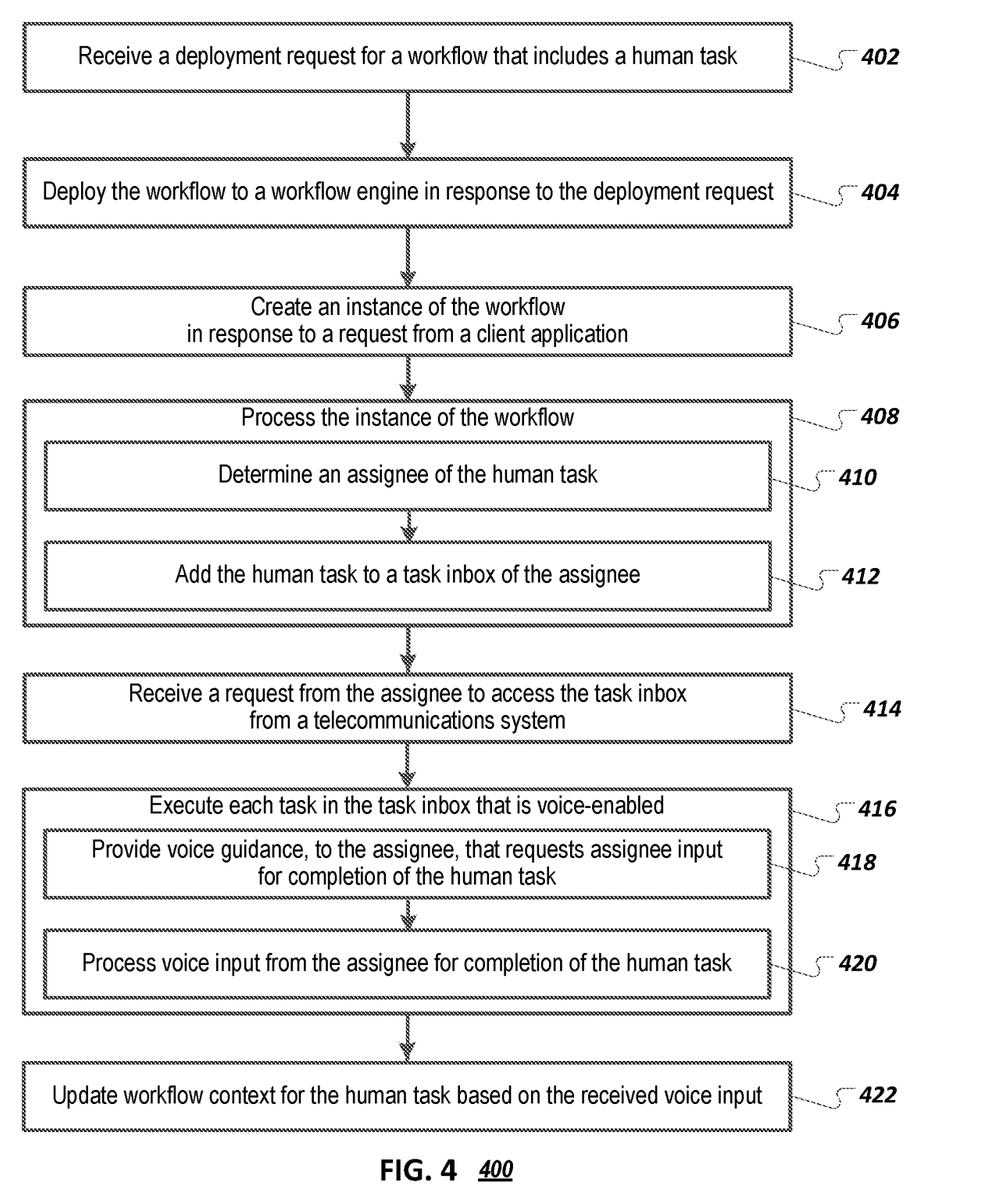
FIG. 4 is a flowchart of an example method for providing voice-enabled human tasks in process modeling.

FIG. 4 is a flowchart of an example method 400 for providing voice-enabled human tasks in process modeling. It will be understood that method 400 and related methods may be performed, for example, by any suitable system, environment, software, and hardware, or a combination of systems, environments, software, and hardware, as appropriate. For example, one or more of a client, a server, or other computing device can be used to execute method 400 and related methods and obtain any data from the memory of a client, the server, or the other computing device. In some implementations, the method 400 and related methods are executed by one or more components of the system 100 described above with respect to FIG. 1. For example, the method 400 and related methods can be executed by the backend server 102 of FIG. 1.

At 402, a deployment request is received for a workflow of an end-to-end process that includes a human task. The human task is enabled to receive voice input. The workflow may have been modeled by a workflow developer, using a workflow editor. The workflow developer may have included the human task in the workflow and indicated that the human task is able to receive voice input.

At 404, the workflow is deployed to a workflow engine in response to the deployment request.

At 406, an instance of the workflow is created in response to a request from a client application.

At 408, the instance of the workflow is processed, including execution of the human task.

At 410, an assignee of the human task is determined.

At 412, the human task is added to a task inbox of the assignee.

At 414, a request is received, from the assignee, to access the task inbox from a telecommunications system.

At 416, each task in the task inbox that is voice-enabled is executed.

At 418, voice guidance output is provided, to the assignee, that requests assignee input for completion of the human task. The voice guidance can be powered by a reverse chat bot (e.g., the reverse chat bot 244), for example. The voice output can be generated by a speech synthesis module of the reverse chat bot that converts metadata associated with the workflow instance to audio directions that are to be played back to the assignee.

At 420, voice input from the assignee is processed, for completion of the human task. Text can be generated from the voice input by a speech to text component. The generated text can be provided to a natural language processing component. The natural language processing component can interpret the generated data and determine information to include as an update to the workflow context. For example, the generated text can correspond to an assignee input of "it is approved, have fun" for a vacation approval task. The natural language processing component can interpret the "it is approved, have fun" text as meaning an approval with a comment of "have fun." A form validator component can validate the generated text, to determine whether the assignee has provided required inputs for completion of the human task. If the form validator component determines that the assignee has not provided required inputs for completion of the human task, follow-up directions can be generated, for the assignee to provide the required inputs. The follow-up directions can be converted to speech by the speech synthesis module and played back to the assignee.

At 422, workflow context for the human task is updated based on the received voice input. For example, the workflow context can be updated with the generated text, and/or with other data generated by the natural language processing component that represents one or more determined meanings of the generated text (e.g., an approval with a comment of "have fun," as in the above example).

The preceding figures and accompanying description illustrate example processes and computer-implementable techniques. But system 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the operations in these processes may take place simultaneously, concurrently, and/or in different orders than as shown. Moreover, system 100 may use processes with additional operations, fewer operations, and/or different operations, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A computer-implemented method comprising:
receiving a deployment request for a workflow of an end-to-end process, wherein the workflow includes at least one voice-enabled human task that is configured to receive voice input and at least one non-voice-enabled human task that is not configured to receive voice input;
deploying the workflow to a workflow engine in response to the deployment request;
creating an instance of the workflow in response to a request from a client application;
processing the instance of the workflow, including executing the at least one voice-enabled human task and the at least one non-voice-enabled human task, wherein executing a respective human task comprises:
determining an assignee of the human task; and
adding the human task to a task inbox of the assignee;
receiving a request from a first assignee to access a first task inbox of the first assignee as a call from a telecommunications device, wherein the first task inbox includes first voice-enabled human tasks and first non-voice-enabled human tasks;
determining that the first non-voice-enabled human tasks are not able to be completed on the call from the telecommunications device, based on the first non-voice-enabled tasks not being configured to receive voice input;
based on the first non-voice-enabled human tasks not being able to be completed on the call with the telecommunications device, omitting the first non-voice enabled human tasks from execution during the call with the telecommunications device; and
executing each of the first voice-enabled human tasks in the first task inbox, wherein executing the first voice-enabled human tasks includes:
providing voice guidance, via the telecommunications device and on the call, to the first assignee that requests assignee input for completion of a particular human task;
processing voice input from the first assignee as input during the call for completion of the particular human task; and
updating workflow context for the particular human task based on the received voice input.

2. The computer-implemented method of claim 1, wherein processing the voice input from the assignee for completion of the particular human task comprises generating text from the voice input.

3. The computer-implemented method of claim 2, wherein the generated text is processed by a natural language processing component.

4. The computer-implemented method of claim 3, wherein the natural language processing component interprets the generated text to determine information for updating the workflow context.

5. The computer-implemented method of claim 3, further comprising validating the generated text, by a form validator component, to determine whether the assignee has provided required inputs for completion of the particular human task.

6. The computer-implemented method of claim 5, wherein, in response to the form validator component determining that the assignee has not provided required inputs for completion of the particular human task, the method further comprises generating follow-up directions for the assignee to provide the required inputs.

7. The computer-implemented method of claim 6, wherein the follow-up directions are converted to speech by a speech synthesis module for playback to the assignee.

8. The computer-implemented method of claim 7, wherein the speech synthesis module generates the voice guidance provided to the assignee that requests assignee input for completion of the particular human task based on metadata associated with the instance of the workflow.

9. The computer-implemented method of claim 3, wherein the generated text is translated from a native language of the user to a standardized language and the voice guidance is provided to the user in the native language.

10. A system comprising:
one or more computers; and
a computer-readable medium coupled to the one or more computers having instructions stored thereon which, when executed by the one or more computers, cause the one or more computers to perform operations comprising:
receiving a deployment request for a workflow of an end-to-end process, wherein the workflow includes at least one voice-enabled human task that is configured to receive voice input and at least one non-voice-enabled human task that is not configured to receive voice input;
deploying the workflow to a workflow engine in response to the deployment request;
creating an instance of the workflow in response to a request from a client application;
processing the instance of the workflow, including executing the at least one voice-enabled human task and the at least one non-voice-enabled human task, wherein executing a respective human task comprises:
determining an assignee of the human task; and
adding the human task to a task inbox of the assignee;
receiving a request from a first assignee to access a first task inbox of the first assignee as a call from a telecommunications device, wherein the first task inbox includes first voice-enabled human tasks and first non-voice-enabled human tasks;
determining that the first non-voice-enabled human tasks are not able to be completed on the call from the telecommunications device, based on the first non-voice-enabled tasks not being configured to receive voice input;
based on the first non-voice-enabled human tasks not being able to be completed on the call with the telecommunications device, omitting the first non-voice enabled human tasks from execution during the call with the telecommunications device; and
executing each of the first voice-enabled human tasks in the first task inbox, wherein executing the first voice-enabled human tasks includes:
providing voice guidance, via the telecommunications device and on the call, to the first assignee that requests assignee input for completion of a particular human task;
processing voice input from the first assignee as input during the call for completion of the particular human task; and
updating workflow context for the particular human task based on the received voice input.

11. The system of claim 10, wherein processing the voice input from the assignee for completion of the particular human task comprises generating text from the voice input.

12. The system of claim 11, wherein the generated text is processed by a natural language processing component.

13. The system of claim 12, wherein the natural language processing component interprets the generated text to determine information for updating the workflow context.

14. The system of claim 12, wherein the operations further comprise validating the generated text, by a form validator component, to determine whether the assignee has provided required inputs for completion of the particular human task.

15. The system of claim 14, wherein, in response to the form validator component determining that the assignee has not provided required inputs for completion of the particular human task, the method further comprises generating follow-up directions for the assignee to provide the required inputs.

16. A computer program product encoded on a non-transitory storage medium, the product comprising non-transitory, computer readable instructions for causing one or more processors to perform operations comprising:
receiving a deployment request for a workflow of an end-to-end process, wherein the workflow includes at least one voice-enabled human task that is configured to receive voice input and at least one non-voice-enabled human task that is not configured to receive voice input;
deploying the workflow to a workflow engine in response to the deployment request;
creating an instance of the workflow in response to a request from a client application;
processing the instance of the workflow, including executing the at least one voice-enabled human task and the at least one non-voice-enabled human task, wherein executing a respective human task comprises:
determining an assignee of the human task; and
adding the human task to a task inbox of the assignee;
receiving a request from a first assignee to access a first task inbox of the first assignee as a call from a telecommunications device, wherein the first task inbox includes first voice-enabled human tasks and first non-voice-enabled human tasks;
determining that the first non-voice-enabled human tasks are not able to be completed on the call from the telecommunications device, based on the first non-voice-enabled tasks not being configured to receive voice input;
based on the first non-voice-enabled human tasks not being able to be completed on the call with the telecommunications device, omitting the first non-voice enabled human tasks from execution during the call with the telecommunications device; and executing each of the first voice-enabled human tasks in the first task inbox, wherein executing the first voice-enabled human tasks includes:

providing voice guidance, via the telecommunications device and on the call, to the first assignee that requests assignee input for completion of a particular human task;

processing voice input from the first assignee as input during the call for completion of the particular human task; and updating workflow context for the particular human task based on the received voice input.

17. The computer program product of claim 16, wherein processing the voice input from the assignee for completion of the particular human task comprises generating text from the voice input.

18. The computer program product of claim 17, wherein the generated text is processed by a natural language processing component.

19. The computer program product of claim 18, wherein the natural language processing component interprets the generated text to determine information for updating the workflow context.

20. The computer program product of claim 18, wherein the operations further comprise validating the generated text, by a form validator component, to determine whether the assignee has provided required inputs for completion of the particular human task.

* * * * *